Feb. 3, 1948.  C. C. LARSON  2,435,316
OPTICAL FOCUSING MEANS FOR IMAGE TRANSLATING DEVICES
Filed Nov. 1, 1943
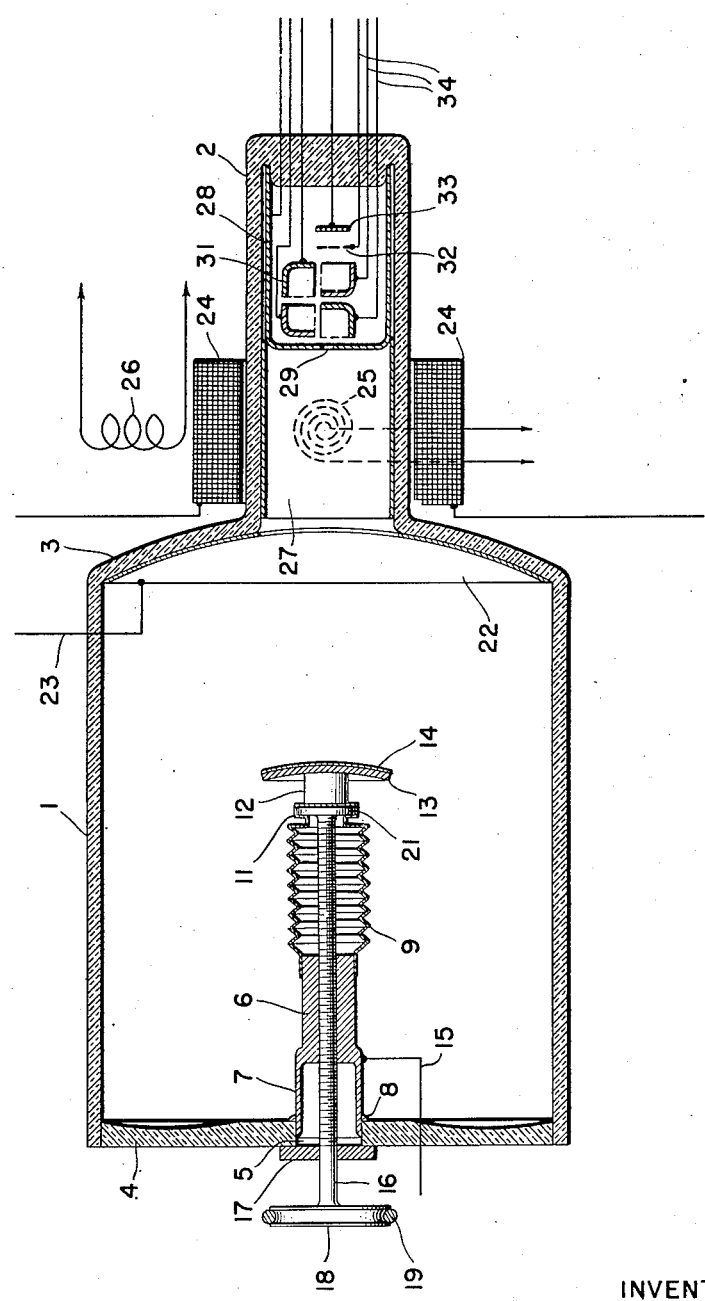
INVENTOR
CHRISTIAN C. LARSON
BY
ATTORNEY Patented Feb. 3, 1948

2,435,316

UNITED STATES PATENT OFFICE 2,435,316

OPTICAL FOCUSING MEANS FOR IMAGE TRANSLATING DEVICES

Christian C. Larson, Fort Wayne, Ind., assignor, by mesne assignments, to Farnsworth Research Corporation, a corporation of Indiana Application November 1, 1943, Serial No. 508,545

5 Claims. (Cl. 250—164)

This invention relates to electro-optical apparatus and particularly to television image translating devices.

According to conventional practice, the electronic tubes employed in television systems, either as image-analyzing tubes or as projection-receiver tubes, ordinarily are provided with lens systems for focusing the optical image properly with respect to the energy-translating element within the tube. Heretofore the television tubes have been of such a character that the lens systems have been located on the outside of the tubes. In order to vary the focus of the optical system, suitable mechanism has been provided to move the lens system or a part thereof relative to the energy-translating element of the tube. Such mechanisms are well-known both in the television art and in the optical arts such as those relating to cameras and similar devices.

In the copending application of Madison Cawein, Serial No. 489,869, filed June 5, 1943, and entitled "Electro-optical device," there is disclosed a television tube in which the optical system of the reflection type is incorporated in the tube itself. Briefly, this tube is one which employs the so-called Schmidt optical system. The concave light reflecting member is disposed within the envelope of the tube and the lens by which there is effected a correction for the spherical aberration of the light-reflecting surface is disposed in or adjacent to the wall of the envelope facing the reflecting surface. In such a device, the energy translating element also has a spherical configuration and is disposed between the reflecting surface and the correcting lens in such a manner that its surface is parallel to the reflecting surface. As disclosed in the copending Cawein application, the three essential members of the Schmidt optical system are fixedly disposed relative to one another. Obviously, a device of this character may be used at maximum efficiency only under one set of conditions for the reason that it is a fixed focus device.

As is well understood in the art, however, television tubes, particularly of the image-analyzing type for use as camera tubes, require some means of varying the optical focus thereof. In many cases it also is desirable to provide for a variation of optical focus in a receiver tube of the projection type. In the type of tube disclosed in the copending Cawein application, the optical focus is determined by the spacing between the concave reflecting surface and the surface of the energy translating element.

Ordinarily the reflecting surface of such a device is disposed adjacent to or is a part of one end wall of the tube and the correcting lens is disposed adjacent to or is a part of the opposite end wall. For a given reflecting surface, there is required a correcting lens of different surface contour for each different spacing between it and the reflecting surface. Consequently, in a tube of this character, the spacing between the reflecting surface and the correcting lens is fixed and the configuration of the lens is appropriate to provide the required correction.

Also it is a characteristic of such a tube that the energy translating element be enclosed within the evacuated envelope. Likewise any variation to be effected in the optical focusing of the device, of necessity, must be made by altering the spacing between the reflecting surface and the energy translating device.

It is the object of the present invention, therefore, to provide a means for varying the optical focus of an image translating device in which at least a part of the optical system is incorporated in an evacuated tube.

In accordance with the present invention, there is provided an evacuated envelope in which there is disposed a reflecting member. A distortable sealing member is provided for the envelope and is arranged in such a manner that one portion thereof is fixed and another portion thereof is movable relative to the reflecting member. An energy translating member is disposed within the envelope so that it faces and is spaced from the reflecting member. Additionally, the energy translating member is linked to the movable portion of the sealing member. There also is provided a means accessible from the exterior of the tube envelope and linked to the movable portion of the sealing member. This means is arranged to be operated so as to distort the sealing member appropriately to effect an alteration in the spacing between the energy translating member and the reflecting member.

More specifically, in accordance with the disclosed embodiment of the invention, the reflecting member is formed on the inside of a spherically-shaped wall of the tube envelope. The opposite wall of the envelope is in the form of a lens having a configuration suitable to correct for the spherical aberration of the reflecting member. There is sealed into an aperture formed in the lens a structure including a flexible tubular member of which one end is fixed and the other end is movable relative to the lens and the reflecting member. A spherically-shaped energy translating member is supported from the movable end of the flexible tubular member. The movable end of the flexible tubular member also is connected by a linkage to the exterior of the envelope so that this end may be actuated to vary the spacing between the energy translating element and the reflecting member.

The character of the energy translating member will depend upon the type of image translating device in which the present invention is embodied. In the case of an image-analyzing tube of the dissector type, the energy translating member will be a photoelectric cathode. For an iconoscope or orthicon type of image-analyzing tube, the energy translating member will be a mosaic surface. In a cathode ray receiver tube for use as a projection device, the energy translating member may be a fluorescent screen. All of these devices require scanning of the image. It is contemplated to be within the scope of the invention that it may be embodied in image translating devices of a character that do not require image scanning.

For a better understanding of the invention, together with other and further objects thereof, reference is had to the following description taken in connection with the accompanying drawing, and its scope will be pointed out in the appended claims.

In the accompanying drawing, the single figure is a sectional view of a dissector tube embodying the invention.

Referring now to the drawing, the dissector tube embodying the invention is provided with a glass envelope 1 surrounding the main or body portion of the tube and a stem portion envelope 2. One end wall 3 of the body portion of the tube is spherically shaped so that a concave surface is formed facing inwardly of the tube. The wall 3 is provided with a centrally disposed aperture whereby to provide communication between the body and stem portions of the tube. The opposite end wall is formed by a transparent lens 4, the outer surface of which is flat and the inner surface of which has a configuration suitable to correct for spherical aberration. The center of curvature for the wall 3 is located approximately at the center of the lens 4.

It is to be noted that the correcting lens need not have the particular configuration illustrated in order to perform its function. Nor is it essential that it be formed integrally with the tube envelope. Obviously, it may be spaced from the end wall of the tube envelope which it is illustrated as forming in the embodiment of the invention disclosed herein. For example, it may be located either on the inside or on the outside of the tube envelope, in which case the end wall of the envelope may be a plane optical window. Regardless of the surface configuration of this end wall, one of its functions is to serve as a window and will be referred to in this manner in certain of the appended claims.

A circular opening 5 is formed at the center of the lens 4 to provide for the mounting of the energy translating element supporting structure. A hollow cylindrical stud 6 is inwardly threaded and is so formed that there is provided at one end thereof a thin shell of material 7. The stud and shell preferably are made of Kovar or any similar metal which readily may be sealed to glass. The outer diameter of the shell 7 is substantially the same as the inner diameter of the opening 5 so that, upon insertion of the shell into the opening, a good supporting contact between the shell and the opening is provided. Any well known glass-to-metal sealing process is employed to form a gas-tight seal 8 around the junction of the shell 7 and the lens plate 4.

One end of a flexible tubular member 9 is affixed in a gas-tight manner to the inwardly extending end of the stud 6. The tubular member may be any one of a number of well known devices such as Sylphon tubing or a cylindrically-shaped flexible bellows. At the inner end of the tubular member 9 there is attached a cap 11 which is provided with an annular recess formed interiorly thereof. The cap 11 may be formed integrally with the tubular member 9 or may be separately formed and affixed in any well known gas-tight manner to the inner end of the tubular member. There also is mounted at the end of the cap 11 a short supporting rod 12. A metallic backing plate 13 is attached to the inner end of the supporting rod 12. This plate may be formed of silver and is provided with a surface which is spherical and substantially parallel to the inner surface of the wall 3. On top of the backing plate 13 is a layer of photoelectric material 14 which is applied to the plate by evaporation or similar process. The structure comprising the backing plate 13 and the photoelectric material 14 constitutes a photoelectric cathode to which an electrical connection may be made by any suitable means such as a conductor 15 attached to the stud 6.

There is threaded into the stud 6 a correspondingly threaded rod 16. Adjacent the outer end of the rod 16 there is provided a bearing plate 17. This plate is attached to the outer surface of the lens 4 by welding or any other well known process. The bearing plate is provided with a centrally disposed opening through which the rod 16 extends. At the outer end of the rod 16 there is affixed a grooved pulley 18. If desired, a flexible cord 19 or other equivalent device may be wrapped partially around the pulley 18 and extended to any desired remote control point. The inner end of the rod 16 is provided with a thin disc 21 which is adapted to fit within the annular recess formed in the cap 11.

A layer of light-reflecting material 22 is disposed on the concave spherical surface of the envelope wall 3. Preferably this material is gold so that the surface formed is a good reflector of invisible light rays such as the infrared rays. However, other materials such as silver may be employed with substantially equal facility within the scope of the invention. The reflecting surface 22 is deposited on the glass wall by sputtering or other suitable process. An electrical connection may be made by a conductor 23 to the reflecting surface 22 and may be extended through the tube envelope 1 as shown or in any other well known manner.

An electromagnetic focusing coil 24 is mounted on the outside of the stem portion envelope 2 at a point adjacent to the spherically-shaped end wall 3. Diagrammatically illustrated horizontal and vertical deflecting coils 25 and 26, respectively, are mounted in a conventional manner adjacent to the focusing coil.

A metallic conducting coating 27 is formed by sputtering or other suitable process upon the inner surface of the stem portion envelope 2. This coating forms a so-called second anode and extends from a point adjacent to the aperture in the curved envelope wall 3 to a point somewhat beyond the scanning coils 25 and 26.

An electron multiplier is mounted in the end of the tube stem and consists of a cylindrical metallic shield 28 which is supported by the press portion of the tube stem. The end opposite to the supported end of the shield is closed with the exception of a small, centrally disposed aperture 29. The apertured end of the shield extends slightly within the end of the second anode wall coating 27 and may be electrically connected thereto if desired, in any suitable manner such as that indicated in the drawing. The multiplier electrodes are supported by suitable means (not shown) within the shield 28. These electrodes include a plurality of secondary electron emissive elements which are illustrated herein as conventional box-type electrodes such as 31. The number of these electrodes illustrated is merely for the purpose of describing the essential components of this embodiment of the invention. The exact number of multiplier secondary emissive electrodes which will be necessary for any particular use will depend upon that use. Also the forms of these electrodes are merely for illustrative purposes and this disclosure is not intended as a limitation of the invention. The electron multiplier also includes a grid collector member 32 disposed between the next to the last multiplier stage and the last stage which in this form comprises an anode 33.

Suitable electrical connections such as 34 may be made through the press portion of the tube stem to the various component electrodes of the electron multiplier.

Referring now to the operation of the illustrated device embodying the invention, it will be assumed that light which is reflected from a subject is directed from the left as viewed in this drawing through the window formed by the correcting lens plate 4. The light which enters the main body portion of the tube through the lens 4 is directed onto the spherically-shaped reflecting surface 22 by which it is reflected onto the smaller spherically-shaped surface of the photoelectric cathode 14. Thus, there is projected onto the cathode 14 an optical image. The light energy which is directed onto the photoelectric cathode is translated into electronic energy whereby an electron image corresponding to the optical image is formed. The electron image is focused by means of the coil 24 into the plane of the aperture 29 formed in the electron multiplier shield 28. The horizontal and vertical scanning coils 25 and 26 function conventionally to scan the electron image whereby the electronic energy which thus is directed into the multiplier is amplified to generate the television video signals in a well known manner.

Where the present invention is embodied in a tube of the iconoscope or orthicon type, the photoelectric cathode 14 will be replaced by a similarly formed mosaic surface. Also the electron multiplier housed in the stem portion of the tube will be replaced by an electron gun.

Where the invention is to be embodied in a receiver tube of the projection type, a fluorescent screen will be substituted for the photoelectric cathode 14. Also the electron multiplier will be replaced by an electron gun. In this case, of course, the energy translation is effected in a sense opposite to that of a camera tube. The electronic energy derived from the gun mounted in the tube stem is converted by the fluorescent screen into light energy whereby to produce an optical image on the surface of the screen disposed in the position of the illustrated photoelectric cathode 14. The light energy radiating from the fluorescent screen is directed onto the reflecting surface 22 from which it is reflected toward the left as viewed in the drawing. The reflected light is transmitted through the correcting lens plate 4 onto a suitable viewing screen.

Returning now to further consideration of the illustrated dissector tube embodiment of the invention, assume that it is desired to alter the optical focus of the device. This may be effected by rotating the threaded rod 16 by means of the pulley 18 and the associated cord 19. By reason of the fact that the space enclosed by the flexible tubing 9 is in communication with the outside of the tube through the interior of the stud 6, this space is at atmospheric pressure. The remaining space within the tube envelope is highly evacuated so that, by reason of the pressure differential between the inside and outside of the flexible tubing 9, the tubing constantly is subjected to an expanding influence. In other words, the relatively higher pressure within the tubing tends to elongate the tubing. This tendency is opposed by the threaded engagement of the stem 16 with the stud 6. The engagement of the disc 21 with the annular recess in the cap 11 also is part of the linkage opposing the expansion of the tubing 9.

It is seen that, by means of the described mechanism, the position of the photoelectric cathode 14 with respect to the reflecting surface 22 may be altered quickly and with a high degree of precision for the reason that, regardless of the sense of the adjustment, there is substantially no backlash present in the structure. This is true even though the disc 21 fits loosely within the annular recess of the cap 11 for the reason that the underside or left-hand face of the disc is in constant engagement with the cap 11. This engagement, of course, is maintained by the ever-present expanding tendency of the tube 9.

While there has ben described what, at present, is considered the preferred embodiment of the invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In an image translating device, an evacuated envelope having a light refractive transparent window, a reflecting member in said envelope facing said window, a threaded stud supported by said window, a gas-tight flexible tubing having one end fixed relative to said window, an energy translating member mounted on said flexible tubing and facing said reflecting member, and a threaded rod operatively engaging said threaded stud and engaged with said flexible tubing, one end of said rod being exterior of said envelope for operation to alter the spacing between said energy translating member and said reflecting surface.

2. In an image translating device, an evacuated envelope, a concave reflecting member in said envelope, a lens forming a wall of said envelope facing said reflecting member, a threaded stud supported in said lens and extending into the interior of said envelope, a gas-tight flexible tubing affixed to said stud, a convex energy translating member mounted on said flexible tubing and having the convex surface facing said reflecting member, and a threaded rod operatively engaging said threaded stud and engaged with said flexible tubing, said rod extending to the exterior of said envelope for operation to alter the spacing between said energy translating member and said reflecting surface.

3. In a television system, a dissector tube having an evacuated envelope, a concave reflecting member in said envelope, a lens to correct for spherical aberration of said reflecting member disposed in spaced relation to and facing said reflecting member, an inwardly threaded stud supported by and sealed in said envelope, said stud extending into the interior of said envelope, a gas-tight flexible tubing affixed to the inwardly extending end of said stud, a convex photoelectric cathode mounted on said flexible tubing and having the convex surface facing said reflecting member, a threaded rod operatively engaging said inwardly threaded stud and engaged with said flexible tubing, said rod extending to the exterior of said envelope for manipulation to alter the spacing between said cathode and said reflecting surface, and an electron multiplier in said envelope disposed in cooperative relationship to said cathode.

4. In a television system, a dissector tube having an evacuated envelope, a spherical reflecting member in said envelope, a lens to correct for spherical aberration of said reflecting member forming a transparent window in said envelope facing said reflecting member, an inwardly threaded hollow stud supported at one end in and sealed to said lens, said stud extending into the interior of said envelope, a gas-tight flexible tubing affixed at one end to the inwardly extending end of said stud, a spherical photoelectric cathode mounted at the other end of said flexible tubing and having the spherical surface substantially parallel to and facing said reflecting member, a threaded rod operatively engaging said inwardly threaded stud and engaged with the cathode supporting end of said flexible tubing, said rod extending to the exterior of said envelope through said lens for manipulation to alter the spacing between said cathode and said reflecting surface, an aperture formed in said reflecting member, an electron multiplier mounted in alignment with said aperture on the side of said reflecting member remote from said cathode, and electromagnetic focusing and scanning means disposed adjacent to said multiplier.

5. In a television system, a dissector tube having an evacuated envelope, an inwardly facing spherical reflecting member formed in one wall of said envelope, a lens to correct for spherical aberration of said reflecting member formed in another wall of said envelope facing said reflecting member, said lens having a circular opening formed substantially at the center thereof, an inwardly threaded hollow cylindrical stud supported at one end in said opening and sealed to said lens, said stud extending into the interior of said envelope, a gas-tight flexible tubing affixed at one end to the inwardly extending end of said stud, a spherical photoelectric cathode mounted at the other end of said flexible tubing and having the spherical surface substantially parallel to and facing said reflecting member, a threaded rod operatively engaging said inwardly threaded stud and engaged with the cathode supporting end of said flexible tubing, said rod extending to the exterior of said envelope for rotation to alter the spacing between said cathode and said reflecting surface, an aperture formed in said reflecting wall member, an electron multiplier mounted in alignment with said aperture on the side of said reflecting member remote from said cathode, and an electromagnetic focusing coil and electromagnetic scanning coils mounted exteriorly of said envelope and interposed between said reflecting surface and said multiplier.

CHRISTIAN C. LARSON.

REFERENCES CITED

The following references are of record in the file of this patent:

UNITED STATES PATENTS

| Number | Name | Date |
|---|---|---|
| 2,167,201 | Dallenbach | July 25, 1939 |
| 2,218,886 | Krause | Oct. 22, 1940 |
| 2,242,275 | Varian | May 20, 1941 |
| 2,166,399 | Dowsett et al. | July 18, 1939 |
| 2,273,801 | Landis | Feb. 17, 1942 |
| 2,295,779 | Epstein | Sept. 15, 1942 |
| 2,295,802 | Nicoll | Sept. 15, 1942 |
| 2,298,808 | Ramberg | Oct. 13, 1942 |
| 2,305,855 | Epstein et al. | Dec. 22, 1942 |
| 2,336,134 | Szegho | Dec. 7, 1943 |
| 2,319,061 | Hillier | May 11, 1943 |
| 2,208,406 | Benedict | July 16, 1940 |
| 2,275,234 | Ruedy | Mar. 3, 1942 |
| 2,206,415 | Marton | July 2, 1940 |

FOREIGN PATENTS

| Number | Country | Date |
|---|---|---|
| 463,201 | Great Britain | Apr. 8, 1937 |